United States Patent
Lambla et al.

(10) Patent No.: US 6,849,697 B2
(45) Date of Patent: Feb. 1, 2005

(54) POLYPHENYLENE SULPHIDE-BASED COMPOSITIONS WITH IMPROVED IMPACT STRENGTH AND PROCESS FOR PREPARING THEM

(75) Inventors: Morand Lambla, Hoenheim (FR);
Raphaël Mestanza, Schiltigheim (FR);
Dar-Jong Lin, Iisin-Chu (TW); Eric Vandevijver, Brussels (BE);
Marie-Paule Collard, Vilvoorde (BE)

(73) Assignee: Solvay Polyolefins, S.A., Brussels (BE)

( * ) Notice: Subject to any disclaimer, the term of this patent is extended or adjusted under 35 U.S.C. 154(b) by 0 days.

(21) Appl. No.: 10/384,754

(22) Filed: Mar. 11, 2003

(65) Prior Publication Data

US 2003/0166797 A1 Sep. 4, 2003

Related U.S. Application Data

(60) Division of application No. 08/327,882, filed on Oct. 24, 1994, now Pat. No. 6,699,946, and a continuation of application No. 07/987,185, filed on Dec. 8, 1992, now abandoned.

(30) Foreign Application Priority Data

Dec. 13, 1991 (BE) .......................................... 09101135

(51) Int. Cl.$^7$ ............................................ C08F 283/00
(52) U.S. Cl. ................................... 525/537; 525/189
(58) Field of Search ................................ 525/189, 537

(56) References Cited

U.S. PATENT DOCUMENTS

| | | | |
|---|---|---|---|
| 3,354,129 A | | 11/1967 | Edmonds et al. |
| 5,204,405 A | | 4/1993 | Orikasa et al. |
| 5,494,962 A | * | 2/1996 | Gauthy et al. ............ 525/193 |
| 5,504,141 A | * | 4/1996 | Collard et al. ............ 524/539 |

FOREIGN PATENT DOCUMENTS

| | | |
|---|---|---|
| EP | 228268 A1 | 7/1987 |
| EP | 345 094 | 12/1989 |
| EP | 360544 A2 | 3/1990 |
| EP | 406 553 A2 | 1/1991 |
| EP | 438777 | 7/1991 |
| EP | 546608 | 6/1999 |
| FR | 2617176 | 12/1988 |
| JP | 58154-757 A | 3/1982 |
| JP | 60-173056 | 6/1985 |
| JP | 61-207462 A | 9/1986 |
| JP | 62-153345 | 8/1987 |
| JP | 63-017549 | 1/1988 |
| JP | 64-26670 | 1/1989 |
| JP | 04-170466 | 6/1992 |
| JP | 04-170467 | 6/1992 |
| JP | 04-296355 | 10/1992 |
| JP | 04-296455 | 10/1992 |
| JP | 3222229 | 8/2001 |

OTHER PUBLICATIONS

Enclosure 3—Japanese allowed Claim 1.
Enclosure 5—Summary table.

* cited by examiner

*Primary Examiner*—Helen L. Pezzuto
(74) *Attorney, Agent, or Firm*—Venable LLP; Marina V. Schneller

(57) ABSTRACT

Polyphenylene sulphide-based compositions essentially containing 60 to 99.5% by weight of polyphenylene sulphide and 0.5 to 40% by weight of a combination (C) containing a compound (C1) chosen from olefinic elastomers containing epoxy groups and a compound (C2) chosen from crosslinking agents containing functional groups which are reactive towards the epoxy groups of the compound (C1) and are chosen from amino, hydroxyl, carboxyl and carboxylic acid anhydride groups. They are obtained by melt-blending polyphenylene sulphide with each of the compounds (C1) and (C2) of the combination (C) successively and in any order.

14 Claims, 4 Drawing Sheets

Figure 1:
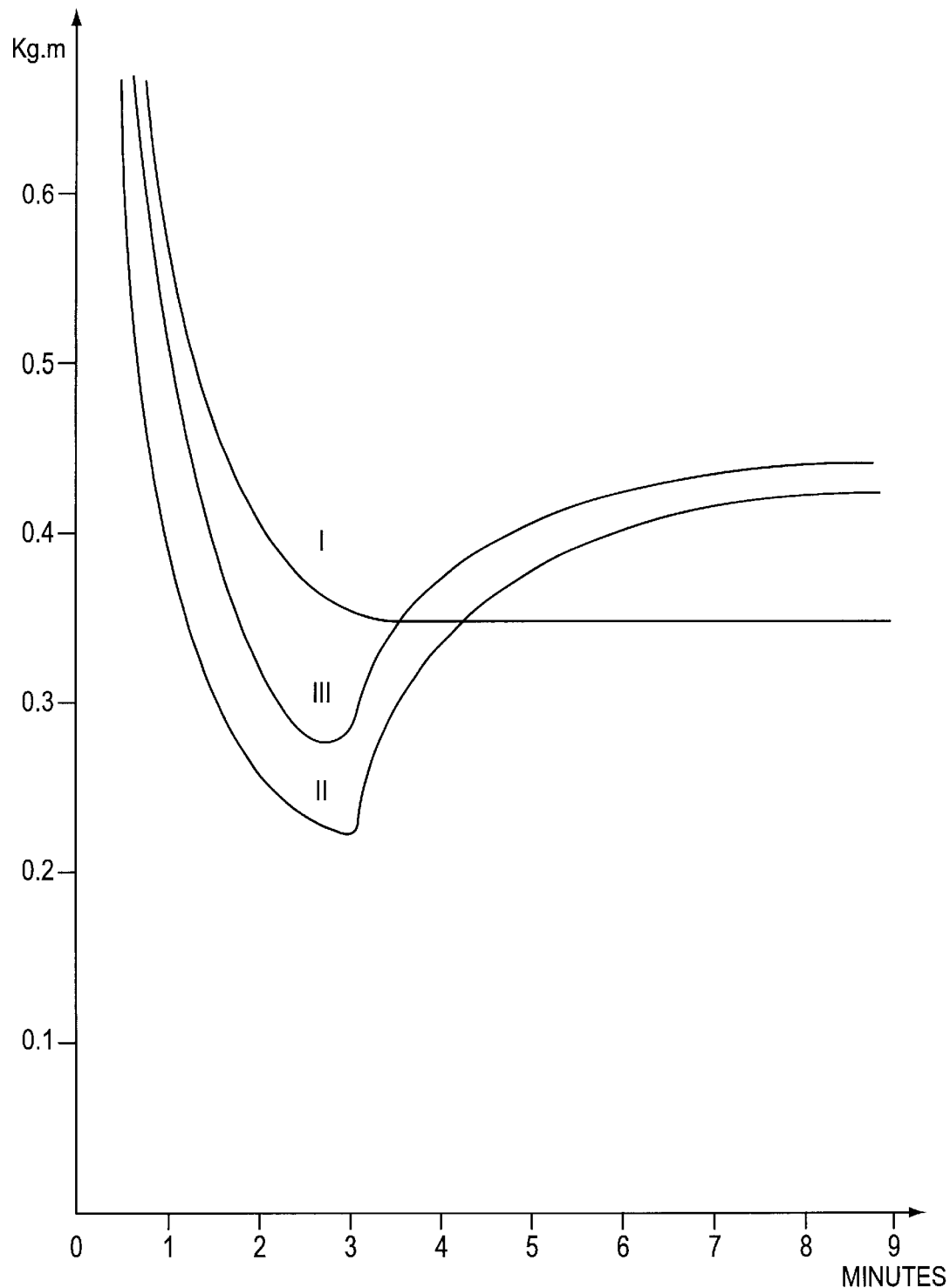

POLYPHENYLENE SULPHIDE-BASED COMPOSITIONS WITH IMPROVED IMPACT STRENGTH AND PROCESS FOR PREPARING THEM

This is a divisional of prior application Ser. No. 08/327,882, filed Oct. 24, 1994, now U.S. Pat. No. 6,699,946 allowed, and a continuation of prior application Ser. No. 07/987,185, filed on Dec. 8, 1992, now abandoned, the Disclosure of which is incorporated herein by reference.

The present invention relates to polyphenylene sulphide-based compositions with improved impact strength. It relates more precisely to compositions containing a polyphenylene sulphide and a product resulting from the crosslinking of an olefinic elastomer containing epoxy groups. It also relates to a process for preparing these compositions.

Poly(phenylene sulphide) (referred to briefly as PPS hereinafter) exhibits an outstanding thermal stability and a very good chemical resistance, which make it a material of choice for the moulding of components which can be employed especially in electrical and electronic applications and in the motor vehicle industry.

However, PPS has the disadvantage of having a low impact strength and hence of being brittle.

Attempts have already been made to overcome this disadvantage by incorporating into PPS elastomeric copolymers derived from olefins and from glycidyl esters of alpha,beta-unsaturated carboxylic acids (Japanese Patent Application published under number 58-154757 (1983) (Toray Industries)). The insufficient reactivity of the molecular chains of PPS towards the elastomeric copolymer nevertheless means that the interfacial cohesion between the disperse elastomeric phase and the continuous phase containing the PPS is mediocre and that the improvement in the impact strength of PPS remains inadequate. Attempts have therefore been made to increase the chemical affinity of PPS for the elastomeric copolymer by subjecting PPS beforehand to a treatment with acid and/or hot water (U.S. Pat. No. 4,889,893 (Toray Industries)). However, the morphology and the processability of the compositions obtained is not satisfactory.

Patent Application FR-A-2,617,176 (Société Chimique des Charbonnages) describes compositions containing a material which may be a polyarylene sulphide and which is strengthened against impact by addition of a copolymer containing ethylene-derived units, units derived from at least one aliphatic ester of an α,β-unsaturated carboxylic acid and units derived from maleic anhydride. The compositions may also contain a chemical agent capable of crosslinking the copolymer and incorporated at the time of the blending of the other constituents of the composition. The morphology of the compositions obtained is not satisfactory either.

It has also been proposed to improve the cohesion between the continuous phase containing the PPS and the disperse phase containing the elastomer by first melt-blending PPS with a polyfunctional isocyanate (4,4'-diphenylmethane diisocyanate) (Patent Application EP-A-0,406,553 (Asahi Kasei)). The composition obtained contains thiourethane bonds which impair its stability.

Patent Application EP-A-0,360,544 (Ube Industries) described thermoplastic compositions comprising PPS and a vinyl copolymer containing epoxy groups and which can also contain a styrene copolymer modified with carboxylic acid anhydride groups.

The mechanical and thermal properties and the processability of these compositions are, however, actually improved only when they additionally contain a polyphenylene ether.

It has now been found that the impact strength of compositions containing PPS can be improved by incorporating therein a particular crosslinked elastomer, using a particular method which makes it possible to disperse it homogeneously in the PPS matrix without impairing the latter's other properties.

Consequently, the present invention relates chiefly to polyphenylene sulphide-based compositions essentially containing 60 to 99.5% by weight of polyphenylene sulphide and 0.5 to 40% by weight of a combination (C) containing a compound (C1) chosen from olefinic elastomers containing epoxy groups and a compound (C2) chosen from crosslinking agents containing functional groups which are reactive towards the epoxy groups of the compound (C1) and chosen from amino, hydroxyl, carboxyl and carboxylic acid anhydride groups.

The polyphenylene sulphide (PPS) present in the compositions according to the invention is a polymer containing at least 70 mol %, preferably at least 90 mol % of p-phenylene sulphide repeat units of formula

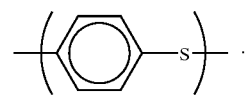

PPSs containing at least 70 mol % of p-phenylene sulphide repeat units impart sufficient thermal stability and chemical resistance to the compositions according to the invention. 30 mol % or less of the repeat units present in the PPS may be chosen from those which have the following structural formulae:

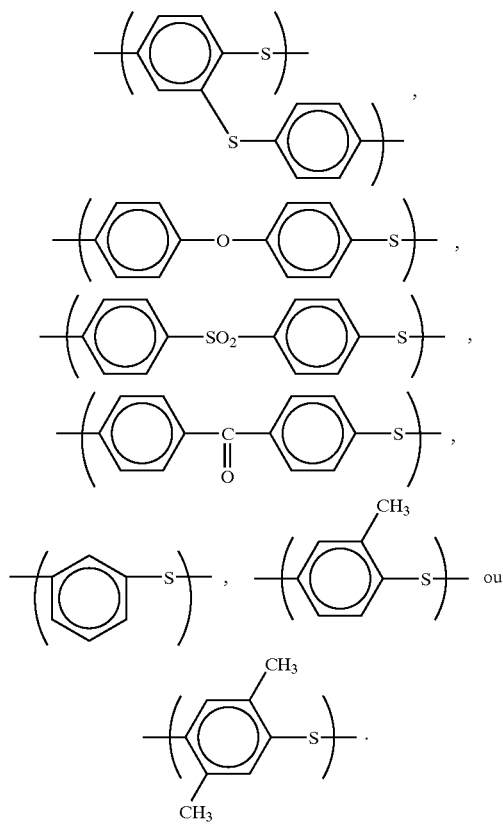

Processes for the manufacture of PPSs which can be employed according to the invention are well known. They can all be employed. A process comprises heating an alkali metal sulphide, in most cases sodium sulphide hydrate, in a polar solvent in order to remove the water of hydration therefrom, followed by the addition of a dihalogenated aromatic compound, in particular p-dichlorobenzene, and polymerisation at higher temperature (see, for example, U.S. Pat. No. 3,354,129 (Phillips Petroleum)). The molecular weight of the PPS obtained can be increased in a known manner by oxidative aftertreatment resulting in branched products or by addition of known agents for increasing the molecular weight (water, esters, anhydrides and alkali metal carboxylates and sulphonates, etc.) to the polycondensation mixture, resulting in linear products of high molecular weight.

The molecular weight of the PPS which can be employed according to the invention may vary within wide measures. It is generally such that the melt index of the PPS is between 5 g/10 min and 10,000 g/10 min, preferably between 10 g/10 min and 500 g/10 min (determined according to ASTM standard D 1238-74 T at a temperature of 315° C. under a 5-kg load).

The PPS which can be employed according to the invention may contain conventional additives in quantities which are not detrimental to the properties of the compositions according to the invention. By way of such additives there may be mentioned in particular: anti-oxidants and heat stabilisers such as, for example, hindered phenols, thioesters and phosphites, anti-UV agents such as, for example, resorcinol, benzotriazole and benzophenone, flame-retardant agents such as, for example, antimony salts, aryl chlorophosphates and chlorinated paraffins, antistatic agents such as, for example, dodecylbenzenesulphonate and poly-alkylene glycols, lubricants such as, for example, graphite, molybdenum disulphide and silicones, corrosion inhibitors such as, for example, alkali metal carbonates, pigments such as, for example, titanium dioxide and zinc sulphide, processing aids such as, for example, aromatic esters of phosphoric acid and microtalc, agents for controlling the degree of crosslinking such as, for example, peroxides, crosslinking accelerators such as, for example, metal salts of thiophosphinic acid, crosslinking inhibitors such as, for example, dialkyltin dicarboxylates or aminotriazole, and the like.

Small quantities of other polymers may also be added to the PPS.

The PPS which can be employed according to the invention may also be treated to improve its affinity for the compound (C1) defined later, with an acid, hot water and/or an organic solvent. Details relating to this treatment, which is known to a person skilled in the art, can be found in U.S. Pat No. 4,889,893 (Toray Industries).

The compositions according to the invention are obtained by introducing a combination (C) containing a compound (C1) and a compound (C2).

The compound (C1) which can be employed in the compositions according to the invention is an olefinic elastomer containing epoxy groups. An "olefinic elastomer containing epoxy groups" is intended to denote elastomeric copolymers derived from olefins and from monomers containing at least one epoxy group and at least one ethylenically unsaturated radical (comonomer (1)).

The olefins from which these copolymers are derived may be α-monoolefins or diolefins containing conjugated double bonds.

Specific examples of α-monoolefins are ethylene, propylene, 1-butene, isobutylene and the like. Ethylene is preferred as α-monoolefin.

Specific examples of diolefins containing conjugated double bonds are 1,3-butadiene, 2-methyl-1,3-butadiene, 2,3-dimethyl-1,3-butadiene, chloroprene, 1,3-pentadiene, 1,3-hexadiene and the like.

1,3-Butadiene is preferred as diolefin containing conjugated double bonds.

The use of a number of different olefins to prepare the compound (C1) also comes within the scope of the invention.

The comonomers (1) from which the elastomeric copolymers (compound (C1)) are derived may be chosen from glycidyl esters of α,β-unsaturated carboxylic acids corresponding to the general formula

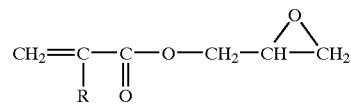

in which R is a hydrogen atom or a $C_{1-8}$ alkyl radical.

Specific examples of glycidyl esters of α,β-unsaturated carboxylic acids are glycidyl acrylate, glycidyl methacrylate, glycidyl α-ethylacrylate, glycidyl itaconate and the like.

The comonomers (1) may also be chosen from glycidyl ethers containing an ethylenic unsaturation, such as allyl glycidyl ether, 2-methylallyl glycidyl ether and styryl p-glycidyl ether, for example, or from other monomers containing an epoxy group and an ethylenically unsaturated radical, such as, for example, 3,4-epoxybutene, 3,4-epoxy-3-methyl-1-butene, 3,4-epoxy-1-pentene, 3,4-epoxy-3-methyl-1-pentene and 5,6-epoxy-1-hexene.

Glycidyl esters of α,β-unsaturated carboxylic acids are preferred as comonomer (1) and, among these, most particularly glycidyl methacrylate.

Apart from the olefins and the comonomers (1), the compounds (C1) may also be derived from at least one other unsaturated comonomer (2) which is copolymerisable with olefins. This comonomer (2) is generally chosen from:

alkyl esters of α,β-unsaturated carboxylic acids, such as, for example, methyl acrylate and methacrylate, ethyl acrylate and methacrylate, n-propyl acrylate and methacrylate, isopropyl acrylate and methacrylate, n-butyl, isobutyl and t-butyl acrylate and methacrylate, vinyl esters of carboxylic acids, such as, for example, vinyl acetate, vinyl propionate and vinyl benzoate, styrene, acrylonitrile, and the like.

Alkyl esters of α,β-unsaturated carboxylic acids are preferred as comonomer (2), and among these, most particularly ethyl acrylate.

The compounds (C1) can be obtained in a known manner by copolymerisation of the corresponding monomers, for example by high-pressure radical copolymerisation of the corresponding monomers.

The quantity of olefin present in the compounds (C1) is generally between 50 and 90% by weight, preferably between 55 and 85% by weight of the compound (C1).

The quantity of comonomer (1) present in the compounds (C1) is generally between 0.1 and 40% by weight, preferably between 0.5 and 30% by weight of the compound (C1). When this latter compound also contains a comonomer (2), this comonomer represents between 0.5 and 50% by weight, preferably between 5 and 45% by weight of the compound (C1).

Quantities of monomer(s) (1) (and (2)) which are too small do not allow the desired effects to be obtained, and quantities of monomer(s) (1) (and (2)) which are too high result in the formation of gels during blending and a deterioration in the mouldability of the compositions according to the invention.

Compounds (C1) which are particularly preferred contain from 60 to 80% by weight of ethylene as α-monoolefin, from 1 to 15% by weight of glycidyl (meth)acrylate as comonomer (1) and from 15 to 40% by weight of $C_{1-4}$ alkyl acrylate as comonomer (2).

The compound (C2) which can be employed in the compositions according to the invention is a cross-linking agent containing functional groups which are reactive towards the epoxy groups of the compound (C1). A "crosslinking agent containing functional groups which are reactive towards the epoxy groups" is intended to denote all the compounds capable of inducing an at least partial crosslinking of the compound (C1), that is to say a bridging between the epoxy groups of the macromolecules of the compound (C1).

The compound (C2) is a nonpolymeric or polymeric polyfunctional compound containing functional groups chosen from amino groups, hydroxyl groups, carboxyl groups and carboxylic acid anhydride groups.

Specific examples of nonpolymeric compounds (C2) containing amino groups in their molecule are aliphatic polyamines such as ethylenediamine, 1,6-hexamethylenediamine, 1,3-diaminopropane, 1,4-diaminobutane, diethylenetriamine, triethylenetetramine, tetraethylenepentamine, ethylaminoethylamine, 2-hydroxyethylaminopropylamine, iminobispropylamine and the like, alicyclic polyamines such as diaminodicyclohexylamine, N-aminoethylpiperazine, 1,3-diaminocyclohexane, bis(4-amino-3-methylcyclohexyl)methane and the like, aliphatic polyamines containing an aromatic nucleus, such as m-xylylenediamine and the like, aromatic polyamines such as diaminodiphenyl ether, diaminodiphenyl sulphone, 4,4'-dimethylenedianiline, 4,4'-bis(o-toluidine), methylenebis(o-chloroaniline) and the like.

Specific example of polymeric compounds (C2) containing amino groups are ethylene copolymers containing ethylenic units and units derived from N,N-dialkyl-aminoalkyl esters of α,β-unsaturated carboxylic acids, such as copolymers of ethylene and of N,N-dimethylamino-ethyl methacrylate and the like, copolymers of ethylene containing ethylenic units and units derived from N,N-dialkylaminoalkylamides of α,β-unsaturated carboxylic acids, such as copolymers of ethylene and of N,N-dimethylaminopropylacrylamide, and the like.

Specific examples of nonpolymeric compounds (C2) containing hydroxyl groups are ethylene glycol, tetra-, hexa- and decamethylene glycols, trimethylolpropane, pentaerythritol and the like.

Specific examples of polymeric compounds (C2) containing hydroxyl groups are phenol-formaldehyde resins of the resole and novolac types, hydrolysed ethylene-vinyl acetate copolymers and the like.

Specific examples of nonpolymeric compounds (C2) are dicarboxylic acids such as malonic acid, maleic acid, succinic acid, adipic acid, sebacic acid, phthalic acid and the like and tricarboxylic acids such as trimellitic acid and the like.

Specific examples of nonpolymeric compounds (C2) containing carboxylic acid anhydride groups are maleic anhydride, succinic anhydride, itaconic anhydride, dodecenylsuccinic anhydride, phthalic anhydride, tetra- hydro- and hexahydrophthalic anhydride, tetrabromophthalic anhydride, trimellitic anhydride and the like, maleic anhydride being preferred.

Specific examples of polymeric compounds (C2) containing carboxyl groups or carboxylic acid anhydride groups are copolymers of olefins and of at least one comonomer (3) chosen from unsaturated carboxylic acids and the anhydrides derived from these acids.

The olefins from which the above copolymers are derived correspond to the same definitions and limitations as the olefins from which the compounds (C1) are derived. Among olefins, α-monoolefins are preferred and, among the latter, ethylene is particularly suitable.

The comonomers (3) from which the above copolymers are derived are chosen from unsaturated carboxylic acids and the anhydrides derived therefrom. Specific examples of unsaturated carboxylic acids which can be employed as comonomers (3) are acrylic acid, methacrylic acid, maleic acid, fumaric acid, itaconic acid, crotonic acid and the like. Specific examples of anhydrides derived from these acids are maleic anhydride, itaconic anhydride and the like. Carboxylic acid anhydrides are preferred as comonomer (3) and, among these, most particularly maleic anhydride.

Apart from the olefins and the comonomers (3), the compounds (C2) of polymeric type may also contain at least one other unsaturated comonomer (2'). This unsaturated comonomer (2') corresponds to the same definitions and limitations as the comonomer (2) which can form part of the composition of the compounds (C1).

The quantity of olefin present in the copolymers of olefins and of at least one comonomer (3) which are defined above and which can be employed as compounds (C2), is generally between 50 and 98% by weight, preferably between 60 and 95% by weight of the copolymer.

The quantity of comonomer (3) present in these copolymers is generally between 0.1 and 30% by weight, preferably between 0.2 and 20% by weight of the copolymer. When these copolymers also contain an unsaturated comonomer (2'), this comonomer represents between 0.5 and 50% by weight, preferably between 2 and 35% by weight of the copolymer.

The olefin copolymers of the comonomer (3) and of the optional comonomer (2') can be obtained in a known manner by high-pressure radical copolymerisation of the corresponding monomers.

Among all the compounds (C2) which can be employed in the compositions according to the invention the preferred ones are the copolymers of olefins, of the comonomer (3) and of the optional comonomer (2'). Specific examples of these copolymers are ethylene/maleic acid copolymers, ethylene/maleic anhydride copolymers, ethylene/acrylic acid copolymers, ethylene/methacrylic acid copolymers, ethylene/ethyl acrylate/maleic acid copolymers, ethylene/ethyl acrylate/maleic anhydride copolymers, ethylene/ethyl acrylate/acrylic acid copolymers, ethylene/ethyl acrylate/methacrylic acid copolymers, ethylene/butyl acrylate/maleic anhydride copolymers, ethylene/butyl acrylate/acrylic acid copolymers, ethylene/butyl acrylate/methacrylic acid copolymers, ethylene/vinyl acetate/maleic anhydride copolymers, ethylene/methyl methacrylate/maleic anhydride copolymers and the like.

The respective quantities of compounds (C1) and (C2) present in the combination (C) are not critical, provided that the quantity of compound (C2) is sufficient to produce at least partial crosslinking of the compound (C1). The quantities of compounds (C1) and (C2) are generally chosen so that the molar ratio (epoxy groups of the compound (C1))/ (functional groups of the compound (C2) which are capable of reacting with the epoxy groups of the compound (C1)) is between 0.1 and 10.

Good results are obtained when this ratio is between 0.2 and 5.

At least some of the PPS-based compositions of the invention contain a particular crosslinking product which the compositions belonging to the prior art do not contain. These compositions, which constitute a particular subject-matter of the present invention, comprise 60 to 99.5% by weight, preferably 70 to 95% by weight, of a PPS matrix (continuous phase) and 0.5 to 40% by weight, preferably 5 to 30% by weight, of a disperse phase of a combination (C) containing the product of the crosslinking of an elastomeric compound (C1) containing from 60 to 80% by weight of ethylene, from 1 to 15% by weight of glycidyl (meth)acrylate and from 15 to 40% by weight of $C_{1-4}$ alkyl acrylate by means of a compound (C2) containing from 65 to 95% by weight of ethylene, from 0.5 to 10% by weight of maleic anhydride and from 3 to 30% by weight of $C_{1-4}$ alkyl acrylate, the compounds (C1) and (C2) having been brought into contact in a molar ratio (epoxy groups of the compound (C1))/(anhydride functional groups of the compound (C2)) of between 0.8 and 1.2.

Apart from the PPS and the combination (C), the compositions according to the invention may also contain other ingredients in quantities which are not detrimental to the properties of these compositions. Thus, in general, these compositions may contain from 5 to 300% of the weight of PPS, preferably from 10 to 200% of the weight of PPS, of one or more fillers or of one or a number of reinforcing materials such as, for example, glass fibres, talc, calcium carbonate, silica, alumina, mica, aluminium silicate, calcium silicate, magnesium oxide, metal powders, quartz powder, ballotini, carbon fibres, potassium titanate fibres, graphite, carbon black and the like; these fillers and these reinforcing materials may be surface-treated with coupling agents such as, for example, silanes and titanates.

As mentioned above, the invention is aimed at improving the impact strength of PPS-based compositions by incorporating the combination (C) therein by a particular method. This method, which is described below, ensures a homogeneous dispersion of fine particles of the crosslinked combination (C) in the PPS matrix of the said compositions. Another aspect of the invention therefore lies in the process for the preparation of these compositions.

The process for the preparation of the compositions according to the invention comprises the melt-blending of the mix containing the PPS (as well as the optional "conventional additives" referred to above) and the compounds (C1) and (C2) of the combination (C). According to the invention this blending must be performed by incorporating each of the compounds (C1) and (C2) of the combination (C), successively and in any order, into the PPS.

The blending may be performed in any device whatever which is capable of bringing the PPS into the molten state and of subjecting it to intensive kneading in this state. In general, this kneading may be performed equally well in noncontinuous or continuous mixer of the external type or of the internal type, such as those marketed by the companies Haake, Loedige, Troester, Wedco, Henschel, Banbury and others. For technical and economic reasons it is preferred to work in mixers of the internal type, in particular in extruders, which constitute a particular class of internal mixers. Although these extruders may be single-screw extruders, it is preferred to work in extruders with two mutually meshing screws (twin screws) rotating in the same direction (corotative twin screw). Well-known extruders of the above preferred type are, for example, those marketed by the company Werner & Pfleiderer under the name ZSK 30.

For the practical implementation of the process of preparation according to the invention in extruders, the latter are fitted with a secondary feed situated at a determined distance from the main feed along the extruder body. This distance can be determined by taking into account the teaching which follows, relating to the time (t) separating the incorporation of the compound (C1) (or (C2)) and the incorporation of the compound (C2) (or (C1)) into the PPS.

The kneading temperature is generally between 280 and 350° C., preferably between 290 and 330° C. Temperatures which are too low do not permit a sufficient melting of the PPS for a homogeneous dispersion of the combination (C) therein. Temperatures which are too high can result in degradation of the PPS and/or of the compounds (C1) and/or (C2).

With regard to the quantity of combination (C) to be incorporated into the PPS, and the respective quantities of compounds (C1) and (C2), reference will be made to the definitions and limitations mentioned above in relation to the compositions themselves.

With regard to the way in which the compounds (C1) and (C2) are incorporated into the PPS, the operation can be carried out, for example, according to one of the following methods of putting it into practice:

(V) incorporation of the compound (C1) by dry mixing with the PPS, melting and kneading of the molten mix (a) thus obtained, incorporation of the compound (C2) into this mix (a) and kneading of the molten mix (aa) thus obtained, (W) incorporation of the compound (C1) by dry mixing with the PPS, melting and kneading of the molten mix (a) thus obtained, incorporation of PPS mixed with the compound (C2) into this mix (a) and kneading of the molten mix (aa)' thus obtained, (X) incorporation of the compound (C2) by dry mixing with the PPS, melting and kneading of the molten mix (b) thus obtained, incorporation of the compound (C1) into this mix (b) and kneading of the molten mix (bb) thus obtained, (Y) melting of the PPS and incorporation of the compound (C1) into the molten PPS, kneading of the molten mix (c) thus obtained, incorporation of the compound (C2) into this mix (c) and kneading of the molten mix (cc) thus obtained, (Z) melting of the PPS and incorporation of the compound (C2) into the molten PPS, kneading of the molten mix (d) thus obtained, incorporation of the compound (C1) into this mix (d) and kneading of the molten mix (dd) thus obtained.

Although each of the methods of implementation (V) to (X) results in compositions exhibiting advantageous properties, the methods of implementation (V) to (X) are preferred, most particularly the method of implementation (V), because it results in impact-resistant compositions in which the combination (C) is dispersed most homogeneously in the PPS matrix with good adherence to the latter.

The time (t) separating the incorporation of the compound (C1) (or (C2)) and the incorporation of the compound (C2) (or C1)) into the PPS may vary within a wide measure. It is a function especially of the capacity or of the throughput of the kneading device, of the kneading period, of the kneading temperature, of the respective quantities of PPS and of combination (C) in the mix and of the respective quantities of compounds (C1) and (C2) in the combination (C).

The optimum time (t) can be determined by taking into account the indications which follow.

The compound (C2) (or C1)) is added after a time (t) which is sufficient to allow the preliminary homogeneous dispersion of the compound (C1) (or (C2)) in the molten PPS matrix. A homogeneous dispersion is intended to mean a dispersion of the compound (C1) (or (C2)) in the form of particles of diameters which generally do not exceed 10 μm, preferably do not exceed 5 μm, most particularly between 2 and 0.3 μm, which are uniformly distributed throughout the PPS matrix. The obtaining of the homogeneous dispersion can be assessed, for example:

- by examining by scanning electron microscopy a sample moulded from the mix of PPS and of the compound (C1) (or (C2)), cooled beforehand and treated with an appropriate solvent capable of extracting the compound (C1) (or (C2)),
- by measuring the torque of the kneading device (this operation is easiest to carry out on a noncontinuous internal mixer) and by incorporating the compound (C2) (or (C1)) into the mix of PPS and of the compound (C1) (or (C2)) when this torque has reached its minimum value.

A time (t) which is too short generally results in a premature crosslinking of the combination (C), producing a composition of irregular morphology and consequently an inadequate impact strength. A time (t) which is too long is not economical and can deteriorate the compositions.

The above implies that the determination of the optimum time (t) may demand some preliminary routine tests taking into account the factors which affect it.

By way of example, with the preferred mixing devices according to the invention (corotative twin-screw extruders operating at approximately 300° C. at a speed of rotation of between 100 and 300 revolutions per minute), the main feed (introduction of the PPS and of the compound (C1) (or (C2)) and the secondary feed (introduction of the compound (C2) (or (C1)) are arranged at a distance such that the time (t) taken by the molten mix to travel from the first to the second is between 10 seconds and 5 minutes, preferably between 15 seconds and 3 minutes.

The process according to the invention makes it possible to obtain a good dispersion of an elastomeric phase in a PPS matrix, with good interfacial cohesion. The compositions which result from the mixing according to the invention exhibit a greatly increased flexibility when compared with PPS alone.

The compositions according to the invention can be converted by known moulding methods into injection-moulded articles and into extruded articles.

The applications are all those for which PPS is employed, namely the injection moulding of technical components with, in this case, improved impact strength properties and better acoustic characteristics (noise attenuation, which is important in the case of components such as cylinder head covers for motor vehicles), and the extrusion of pipes, filaments, films and the like.

The following examples illustrate the invention with reference to FIGS. 1 to 4 which are attached to the description. Examples 1R and 4R are given by way of comparison.

FIG. 1 is a diagram illustrating the change, as a function of time (minutes) in the torque (kg m) of the noncontinuous Haake mixer used for melt-blending the compositions of Examples 1R (curve I), 2 (curve II) and 3 (curve III).

Figure 2:
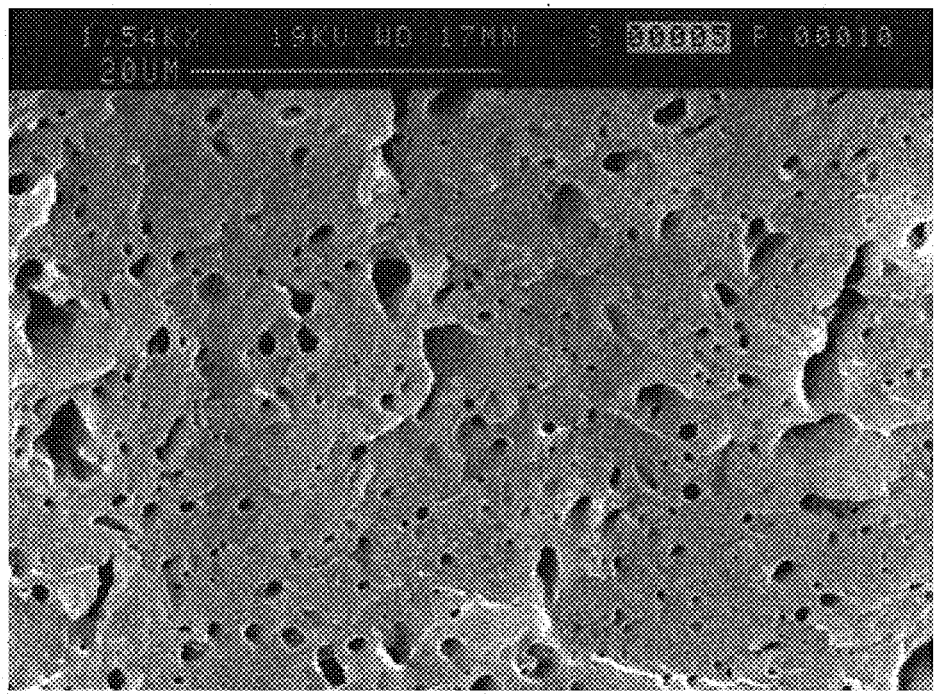

FIG. 2 reproduces a photomicrograph, obtained by scanning electron microscopy (SEM), of a fracture surface of a sample of the composition of Example 1R.

Figure 3:
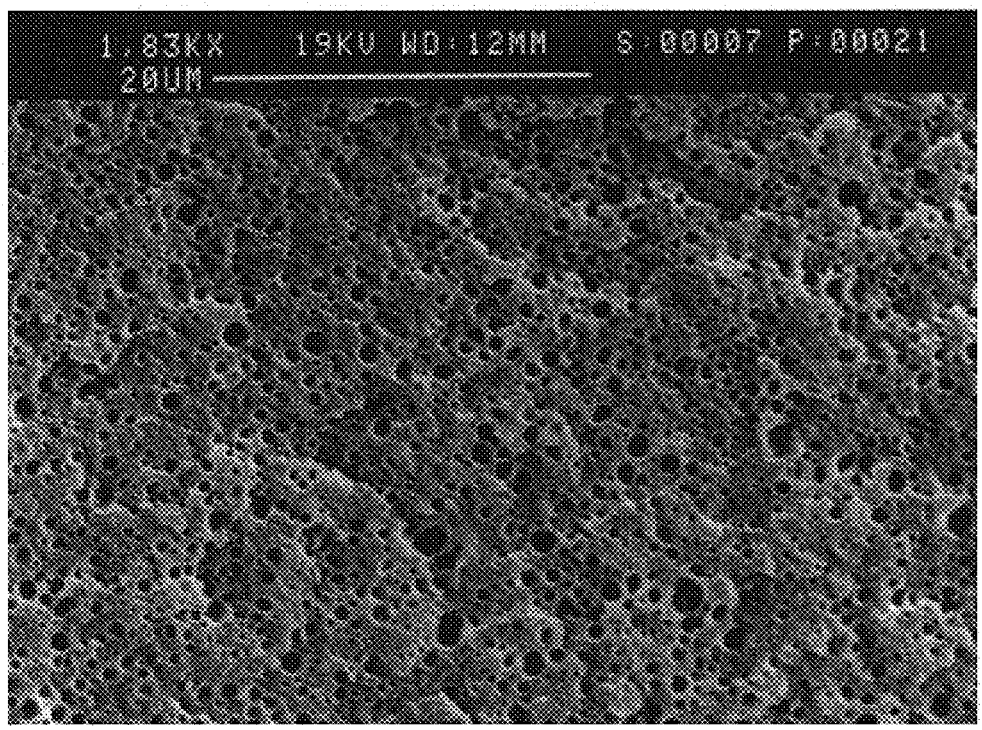

FIG. 3 reproduces a photomicrograph, obtained by SEM, of a fracture surface of a sample of the composition of Example 2.

Figure 4:
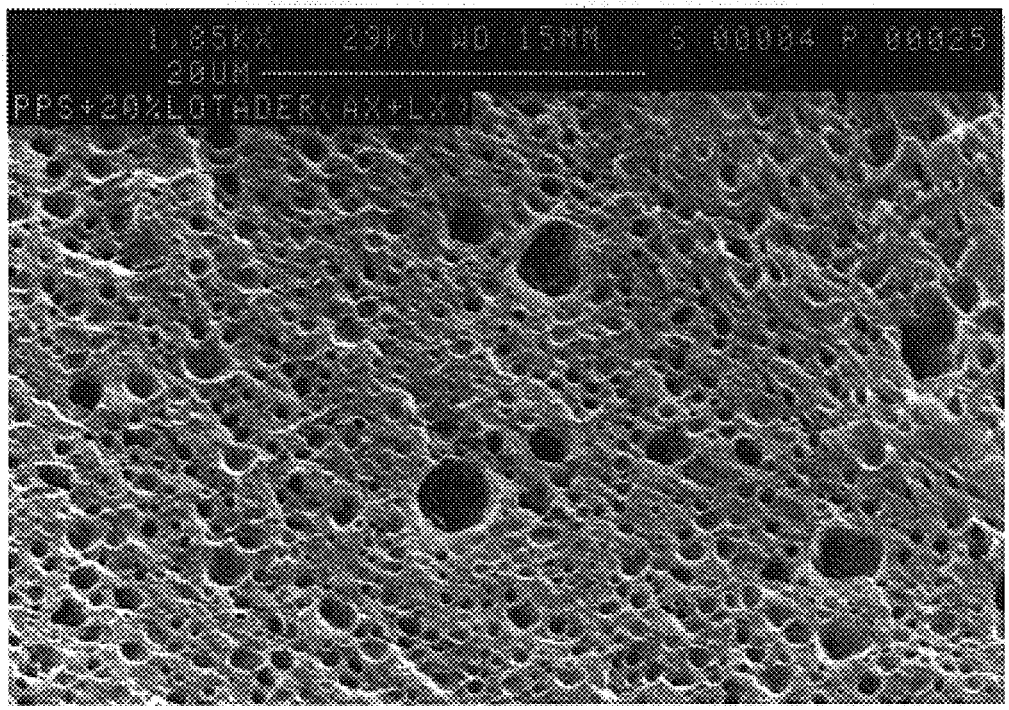

FIG. 4 reproduces a photomicrograph, obtained by SEM, of a fracture surface of a sample of the composition of Example 3.

EXAMPLE 1R

This example is given by way of comparison. 80 parts by weight of a partially crosslinked PPS powder marketed by Tohpren under the name T-4 are mixed with 20 parts by weight of a combination (C) comprising 38 parts by weight of a terpolymer (compound (C1)) containing 68% by weight of ethylene
30% by weight of ethyl acrylate
2% by weight of glycidyl methacrylate (Atochem product Lotader AX8660)

and 62 parts by weight of a terpolymer (compound (C2)) containing 91.8% by weight of ethylene
4.9% by weight of butyl acrylate
3.3% by weight of maleic anhydride.

The PPS and the compounds (C1) and (C2) are introduced simultaneously into a noncontinuous Haake mixer adjusted to a temperature of 300° C. and rotating at a speed of 64 revolutions/minute. The kneading is continued for 6 minutes.

The change in the mixer torque as a function of time is shown by curve I in the diagram of FIG. 1. No increase in the torque is noted during the kneading.

The morphology of the composition obtained is examined by SEM (magnification: 1540 times) on a sample whose surface has been treated with xylene and with ultrasonics. The photomicrograph obtained is shown in FIG. 2. This figure shows that the morphology of the composition obtained is irregular (the network formed by the crosslinking has been torn up by shearing in the mixer).

EXAMPLE 2

The procedure is as in Example 1R except that the compound (C2) is introduced into the mixer 3 minutes after the introduction of the PPS and of the compound (C1).

The change in the mixer torque as a function of time is shown by curve II of the diagram of FIG. 1. An increase in the torque is noted as soon as the compound (C2) is introduced, an increase which is attributable to the crosslinking of the combination (C).

The morphology of the composition obtained is examined by SEM (magnification: 1830 times) on a sample whose surface has been treated with xylene and with ultrasonics. The photomicrograph obtained is shown in FIG. 3. This figure shows that the morphology of the composition obtained is very regular, the particles of the combination (C) which are dispersed in the PPS matrix exhibiting a mean diameter of approximately 0.6 μm, being distributed homogeneously in the said matrix and adhering well to the latter. The delayed incorporation of the compound (C2) has resulted in a crosslinking (responsible for the increase in the mixer torque) which has stabilised the morphology of the composition.

EXAMPLE 3

The procedure is as in Example 1R except that the compound (C1) is introduced into the mixer 3 minutes after the introduction of the PPS and of the compound (C2).

The change in the mixer torque as a function of time is shown by curve III of the diagram of FIG. 1. An increase in the torque is noted as soon as the compound (C1) is introduced, an increase attributable to the crosslinking of the combination (C).

The morphology of the composition obtained is examined by SEM (magnification: 1850 times) on a sample whose surface has been treated with xylene and with ultrasonics. The photomicrograph obtained is shown in FIG. 4. This figure shows that the morphology of the composition obtained is very regular, the particles of the combination (C) dispersed in the PPS matrix exhibiting a mean diameter of approximately 1 μm, being distributed homogeneously in the said matrix and adhering well to the latter. The delayed incorporation of the compound (C1) has resulted in a crosslinking (responsible for the increase in the mixer torque) which has stabilised the morphology of the composition.

EXAMPLE 4R AND EXAMPLES 5 TO 8

Example 4R is given by way of comparison.

In the case of these examples, a corotative twin-screw extruder marketed by Werner & Pfleiderer under the name ZSK 30 (L/d ratio=42), stabilised at 300° C. and in which the speed of rotation of the screws is 300 revolutions/minute, is employed.

The main feed (A1) and the secondary feed (A2) of the extruder are separated by a distance corresponding to 10 d.

EXAMPLE 4R

The extruder is fed at A1 only, with PPS-T4 powder at a rate of 7 kg/hour.

EXAMPLE 5

The extruder is fed:
at A1 at a rate of 6.7 kg/hour with PPS-T4 containing 7.5% by weight of a ground terpolymer (compound (C2)) containing 68% by weight of ethylene 24% by weight of ethyl acrylate 8% by weight of maleic anhydride (Atochem product Lotader L3700),
and at A2 with the compound (C1) identified in Example 1R (Atochem product Lotader AX 8660) (rate: 0.172 kg/hour).

EXAMPLE 6

The extruder is fed:
at A1, at a rate of 6.7 kg/hour, with PPS-T4 containing 15% by weight of the product Lotader L3700,
and at A2 with the product Lotader AX 8660 (rate: 0.353 kg/hour).

EXAMPLE 7

The extruder is fed:
at A1, at a rate of 6.7 kg/hour, with PPS-T4 containing 2.5% by weight of the product Lotader AX 8660,
and at A2 with the product Lotader L3700 (rate: 0.543 kg/hour).

EXAMPLE 8

The extruder is fed:
at A1, at a rate of 6.7 kg/hour, with PPS-T4 containing 5% by weight of the product Lotader AX 8660,
and at A2 with the product Lotader L3700 (rate: 1.186 kg/hour).

EXAMPLE 9

The extruder is fed:
at A1 with PPS-T4 containing 22.1% by weight of the product Lotader AX 8660, at a rate of 5.5 kg/h,
at A2 with PPS-T4 containing 3.5% by weight of maleic anhydride (rate 0.5 kg/h).
Extrusion temperature: 300° C., at a speed of 250 revolutions/minute.

EXAMPLE 10

The extruder is fed:
at A1 with PPS-T4 containing 11.1% by weight of the product Lotader AX 8660, at a rate of 5.5 kg/h,
at A2 with PPS-T4 containing 3.5% by weight of maleic anhydride (rate 0.5 kg/h).
Extrusion temperature: 300° C., at a speed of 250 revolutions/minute.

The individual conditions and the results of these examples are collated in the table below.

In this table: the Izod impact strength test is measured according to the standard D 256-90b, the elongation at break: measured according to ASTM standard D638 (conditions: 5 mm/s at 23° C., thickness of the test pieces: 4 mm).

The test pieces intended for these tests were obtained by injection moulding of samples of the compositions of Examples 4R to 8 on a Nestal 60 press.

TABLE

|  | Main feed (A1) | Secondary feed (A2) | Molar ratio: epoxy groups/ anhydride functional groups | Izod test (unnotched test piece) (J/m) | Elongation at break (%) |
|---|---|---|---|---|---|
| Example 4R | PPS alone | — | — | 115.8 | 1.2 |
| Example 5 | PPS + 7.5% wt of product Lotader L3700 | Product Lotader AX8660 | ±1 | 598 | 6.6 |
| Example 6 | PPS + 15% wt of product Lotader L3700 | Product Lotader AX8660 | ±1 | 1398 | 13.1 |
| Example 7 | PPS + 2.5% wt of product Lotader AX8660 | Product Lotader L3700 | ±1 | 746 | 12 |
| Example 8 | PPS + 5% wt of product Lotader AX8660 | Product Lotader L3700 | ±1 | 1790 | 25 |
| Example 9 | PPS + 22.1% wt of product | PPS + 3.5% wt of maleic | 0.92 | >1800 | 48 |

TABLE-continued

|  | Main feed (A1) | Secondary feed (A2) | Molar ratio: epoxy groups/ anhydride functional groups | Izod test (unnotched test piece) (J/m) | Elongation at break (%) |
|---|---|---|---|---|---|
| Example 10 | Lotader AX8660 PPS + 11.1% wt of product Lotader AX8660 | anhydride PPS + 3.5% wt of maleic anhydride | 0.46 | >900 | 40 |

What is claimed is:

1. A process for preparing a polyphenylene sulphide composition consisting essentially of 60 to 99.5% by weight of polyphenylene sulphide and 0.5 to 40% by weight of a combination (C) containing a compound (C1) chosen from olefinic elastomers containing epoxy groups and a compound (C2) chosen from crosslinking agents containing functional groups which are reactive towards the epoxy groups of the compound (C1) and selected from the group consisting of amino, hydroxyl, carboxyl and carboxylic acid anhydride groups,
wherein the process comprises melt-blending a mix containing the polyphenylene sulphide and the compounds (C1) and (C2) of the combination (C), wherein this blending is performed by incorporating each of the compounds (C1) and (C2) of the combination (C), successively and in any order, into the polyphenylene sulphide.

2. The process of claim 1, wherein the process comprises melt-blending the mix containing the polyphenylene sulfide and the compounds C1 and C2 of the combination C in a corotative twin-screw extruder.

3. The process of claim 1, wherein the compound (C1) is incorporated into the polyphenylene sulphide by dry mixing with the latter, in that the molten mix (a) thus obtained is melted and kneaded and in that the compound (C2) is incorporated into this mix (a) and in that the molten mix (aa) thus obtained is kneaded.

4. The process of claim 1, wherein the compound (C2) is incorporated into a mix containing the polyphenylene sulphide and the compound (C1) after homogeneous dispersion of the compound (C1) in the molten polyphenylene sulphide matrix.

5. The process of claim 1, wherein the compound (C1) is incorporated into a mix containing the polyphenylene sulphide and the compound (C2) after homogeneous dispersion of the compound (C2) in the molten polyphenylene sulphide matrix.

6. The process of claim 1, wherein the compound (C2) is incorporated into a mix containing the polyphenylene sulphide and the compound (C1) after melting of a mix (a) resulting from the homogeneous dispersion of the compound (C1) in the molten polyphenylene sulphide matrix and granulation of this mix (a).

7. The process of claim 1, wherein the compound (C1) is incorporated into a mix containing the polyphenylene sulphide and the compound (C2) after melting of a mix (a) resulting from the homogeneous dispersion of the compound (C2) in the molten polyphenylene sulphide matrix and granulation of this mix (a).

8. The process of claim 1, in which the compound (C1) is incorporated into the polyphenylene sulphide by dry mixing with the latter, melting is carried out and the molten mix (a) thus obtained is kneaded, the compound (C2) mixed with the polyphenylene sulfide is incorporated into this mix (a), and the molten mix (aa)' thus obtained is kneaded.

9. The process of claim 1 wherein the polyphenylene suphide composition consists of 60 to 99.5% by weight of polyphenylene sulphide and 0.5 to 40% by weight of a crosslinked combination (C) consisting essentially of:
a compound (C1) consisting of an elastomeric copolymer derived from at least one olefin and at least one comonomer (1) containing at lest one epoxy group and at least one ethylenically unsaturated radical, and at least one other unsaturated comonomer (2), an alkyl ester, of an α,β-unsaturated carboxylic acid, and a polymeric crosslinking agent (C2), consisting of a copolymer of an olefin and of at least one comonomer (3) selected from the group consisting of unsaturated carboxylic acids and carboxylic acid anhydride groups derived from these acids, and at least one other unsaturated comonomer (2') selected from alkyl esters of an α,β-unsaturated carboxylic acid, said crosslinking agent (C2) being crosslinked with said compound (C1).

10. The process according to claim 9, wherein the comonomer (1) is a glycidyl ester of α,β-unsaturated carboxylic acid.

11. The process according to claim 9, in which the crosslinking agent (C2) is a copolymer of an olefin and of maleic anhydride, and at least one other unsaturated comonomer (2') selected from alkyl esters of an α,β-unsaturated carboxylic acid.

12. The process according to claim 9, wherein the quantities of compounds (C1) and (C2) which are present in the combination (C) are chosen so that the molar ratio (epoxy groups of the compound (C1))/(functional groups of the compound (C2) which are capable of reacting with the epoxy groups of the compound (C1)) is between 0.1 and 10.

13. The process according to claim 1, wherein the combination (C) consists essentially of the product of the crosslinking of an elastomeric compound (C1) containing from 60 to 80% by weight of ethylene, from 1 to 15% by weight of glycidyl (meth) acrylate and from 15 to 40% by weight of $C_{1-4}$ alkyl acrylate by means of a compound (C2) containing from 65 to 95% by weight of ethylene, from 0.5 to 10% by weight of maleic anhydride and from 3 to 30% by weight of $C_{1-4}$ alkyl acrylate, the compounds (C1) and (C2) having been brought into contact in the molar ratio (epoxy groups of the compound (C1))/(anhydride functional groups of the compound (C2)) of between 0.8 and 1.2.

14. The process of claim 1 wherein the polyphenylene sulphide composition consists of 60 to 99.5% by weight of polyphenylene sulphide and 0.5 to 40% by weight of a crosslinked combination (C) consisting of:
a compound (C1) consisting of an elastomeric copolymer derived from at least one olefin and at least one comonomer (1) containing at least one epoxy group and at least one ethylenically unsaturated radical, and at least one other unsaturated comonomer (2), an alkyl ester, of α-β-unsaturated carboxylic acid, and
a polymeric crosslinking agent (C2), consisting of a copolymer of an olefin and of at least one comonomer (3) selected from the group consisting of unsaturated carboxylic acids and carboxylic acid anhydride groups derived from these acids, and at least one other unsaturated comonomer (2') selected from alkyl esters of an α-β-unsaturated carboxylic acid, said crosslinking agent (C2) being crosslinked with said compound (C1).

* * * * *